US008892599B2

(12) United States Patent
Lindblad et al.

(10) Patent No.: US 8,892,599 B2
(45) Date of Patent: Nov. 18, 2014

(54) APPARATUS AND METHOD FOR SECURING PRELIMINARY INFORMATION ABOUT DATABASE FRAGMENTS FOR UTILIZATION IN MAPREDUCE PROCESSING

(71) Applicant: MarkLogic Corporation, San Carlos, CA (US)

(72) Inventors: Christopher Lindblad, Berkeley, CA (US); Jane X. Chen, San Carlos, CA (US)

(73) Assignee: MarkLogic Corporation, San Carlos, CA (US)

( * ) Notice: Subject to any disclaimer, the term of this patent is extended or adjusted under 35 U.S.C. 154(b) by 206 days.

(21) Appl. No.: 13/659,775

(22) Filed: Oct. 24, 2012

(65) Prior Publication Data

US 2014/0114994 A1    Apr. 24, 2014

(51) Int. Cl.
*G06F 17/30*    (2006.01)

(52) U.S. Cl.
USPC ............ 707/770; 707/753; 707/755; 707/778

(58) Field of Classification Search
USPC ........... 707/753, 755, 770, 775, 778, E17.032
See application file for complete search history.

(56) References Cited

U.S. PATENT DOCUMENTS

| | | | |
|---|---|---|---|
| 6,289,334 B1 * | 9/2001 | Reiner et al. ........................ | 1/1 |
| 7,895,189 B2 * | 2/2011 | Balmin et al. ................ | 707/715 |
| 2006/0218123 A1 * | 9/2006 | Chowdhuri et al. .............. | 707/2 |
| 2009/0089560 A1 * | 4/2009 | Liu et al. ........................ | 712/226 |
| 2010/0138442 A1 * | 6/2010 | Shinkawa et al. ............. | 707/769 |
| 2011/0047172 A1 * | 2/2011 | Chen et al. ..................... | 707/764 |
| 2011/0302583 A1 * | 12/2011 | Abadi et al. .................. | 718/102 |
| 2013/0138626 A1 * | 5/2013 | Delafranier et al. .......... | 707/713 |
| 2014/0059552 A1 * | 2/2014 | Cunningham et al. ........ | 718/102 |

OTHER PUBLICATIONS

Fegaras et al., An Optimization Framework for Map-Reduce Queries, Mar. 26-30, 2012, ACM, pp. 26-37.*
Bonifati et al., XPath Lookup Queries in P2P Networks, Nov. 12-13, 2004, ACM, pp. 48-55.*

* cited by examiner

*Primary Examiner* — Leslie Wong
(74) *Attorney, Agent, or Firm* — Cooley LLP

(57) ABSTRACT

A method of processing a query in a distributed database implemented across a set of nodes includes receiving a query. The query is divided into split characterization queries. The split characterization queries are distributed to worker nodes. Each worker node stores a partition of the distributed database with encoded textual objects and pre-defined indices characterizing encoded textual object fragments. The split characterization queries are executed at the worker nodes to obtain preliminary information about query results. Executing the split characterization queries includes matching query fragments associated with the split characterization queries with encoded textual object fragments of the pre-defined indices to produce fragment matches representative of the size of the query results. For each split characterization query the preliminary information about query results includes a fragment count, a database partition identification, and a database host name.

16 Claims, 7 Drawing Sheets

```
                                                    400
    <names>                                      ↙
        <name>
            <first>John</first>
            <middle>James</middle>
            <last>Smith</last>
        <name>
            <first>Ken</first>
            <middle>Bill</middle>
            <last>Wrangler</last>
        </name>
    </names>
```

| Value in Element | Document ID | Position in Document |
|---|---|---|
| John | ID_1 | Position X |
| Ken | ID_2 | Position Y |

602 = Value in Element column
604 = Document ID column
606 = Position in Document column
608 = John row
610 = Ken row
600 = table

FIG. 6

APPARATUS AND METHOD FOR SECURING PRELIMINARY INFORMATION ABOUT DATABASE FRAGMENTS FOR UTILIZATION IN MAPREDUCE PROCESSING

FIELD OF THE INVENTION

This invention relates generally to distributed databases in networked environments. More particularly, this invention relates to securing preliminary information about database fragments for utilization in MapReduce processing.

BACKGROUND OF THE INVENTION

A distributed database is an information store that is controlled by multiple computational resources. For example, a distributed database may be stored in multiple computers located in the same physical location or may be dispersed over a network of interconnected computers. Unlike parallel systems, in which processors are tightly coupled and constitute a single database system, a distributed database has loosely coupled sites that share no physical components.

MapReduce is a programming model used in connection with distributed databases. A "map" step takes input and divides it into smaller sub-problems and distributes them to worker nodes. A master node typically performs this initial operation. However, each worker node may repeat the operation, leading to a multi-level tree structure. Each worker node processes the smaller problem and passes the answer back to its master node.

The "reduce" step involves the master node collecting the answers to all of the sub-problems and combining them to form the output result. MapReduce allows for distributed processing of the map and reduce operations. When each map operation is independent of others, all maps can be performed in parallel. Similarly, reduce operations can typically be performed in parallel.

An input reader divides the input into appropriate size splits, which are subsets of input data assigned to a map task. The input reader reads data from a source and generates key/value pairs. The source may be a database or a file system. In the case of a database, one or more rows are read. In the case of a file system one or more lines of text may be returned as a record. This creates scalability challenges. First, redundancy is created since each task needs to execute the same query and scan through an overlapping set of rows in order to fetch the rows assigned to the task. Second, large amounts of data need to be moved, which generates network traffic and consumes processing time.

One type of data source that may exist in a distributed database is a tree-structured database. A tree-structured database includes a top-down tree characterizing the structure of a document from a root node through a set of fanned out nodes. Various pre-computed indices may characterize fragments of the top-down tree. A tree-structured database is an example of what is more generally referred to herein as a database with encoded textual objects.

Existing MapReduce implementations fail to efficiently integrate with databases with encoded textual objects. The present invention address this shortcoming in the prior art.

SUMMARY OF THE INVENTION

A method of processing a query in a distributed database implemented across a set of nodes includes receiving a query. The query is divided into split characterization queries. The split characterization queries are distributed to worker nodes. Each worker node stores a partition of the distributed database with encoded textual objects and pre-defined indices characterizing encoded textual object fragments. The split characterization queries are executed at the worker nodes to obtain preliminary information about query results. Executing the split characterization queries includes matching query fragments associated with the split characterization queries with encoded textual object fragments to produce fragment matches representative of the size of the query results. For each split characterization query the preliminary information about query results includes a fragment count, a database partition identification, and a database host name.

A non-transitory computer readable storage medium includes executable instructions to execute a split characterization query against a partition of a distributed database with encoded textual object fragments and pre-defined indices characterizing encoded textual object fragments. The executable instructions to execute include executable instructions to match query fragments associated with the split characterization query with encoded textual object fragments of the pre-defined indices to produce fragment matches representative of the size of query results. Preliminary information about the query results is generated. The preliminary information includes a fragment count, a database partition identification, and a database host name.

BRIEF DESCRIPTION OF THE FIGURES

The invention is more fully appreciated in connection with the following detailed description taken in conjunction with the accompanying drawings, in which:

FIG. 6 illustrates an exemplary index that may be formed to characterize the document of FIG. 4.

Like reference numerals refer to corresponding parts throughout the several views of the drawings.

DETAILED DESCRIPTION OF THE INVENTION

Figure 1:
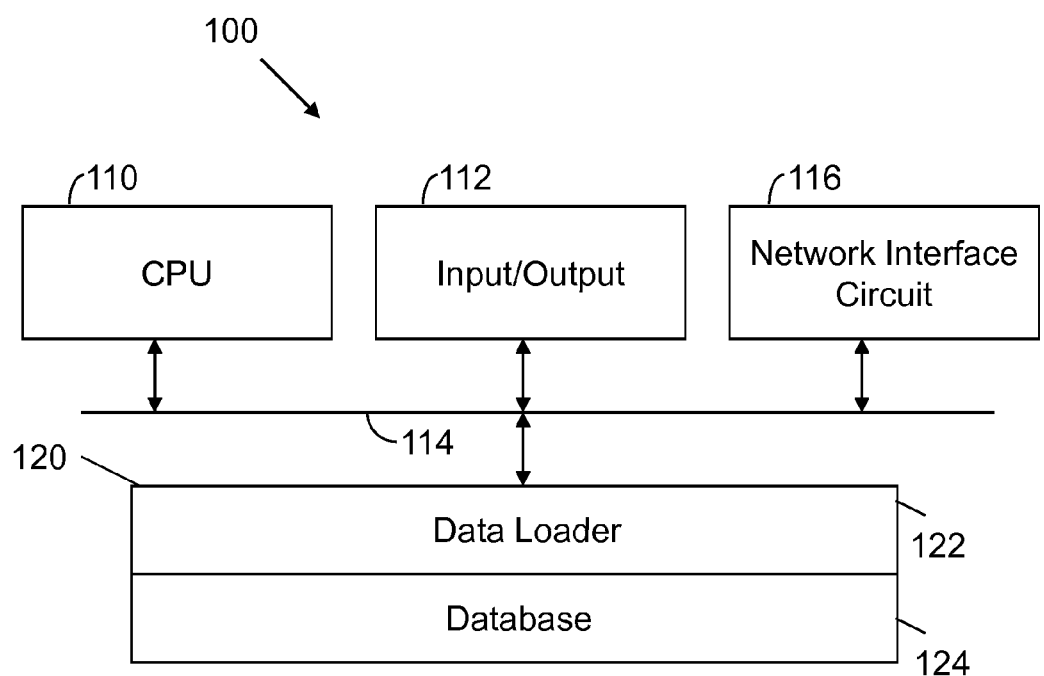
FIG. 1 illustrates a computer that may be utilized in accordance with an embodiment of the invention.

Encoded textual objects may be formed in any number of ways. For example, a variety of markup languages may be used. Extensible Markup Language (XML) is a restricted form of SGML, the Standard Generalized Markup Language defined in ISO 8879 and XML is one form of structuring data. XML is more fully described in "Extensible Markup Language (XML) 1.0 (Fifth Edition)", W3C Recommendation (26 Nov. 2008), which is incorporated by reference herein for all purposes [and available at http://www.w3.org/TR/REC-xml/] (hereinafter, "XML Recommendation"). XML is a useful form of structuring data because it is an open format that is human-readable and machine-interpretable. Other structured languages without these features or with similar features might be used instead of XML, but XML is currently a popular structured language used to encapsulate (obtain, store, process, etc.) data in a structured manner.

An XML document has two parts: 1) a markup document and 2) a document schema. The markup document and the schema are made up of storage units called "elements", which can be nested to form a hierarchical structure. The following is an example of an XML markup document:

```
<citation publication_date=01/02/2012>
    <title>MarkLogic Query Language</title>
    <author>
        <last>Smith</last>
        <first>John</first>
    </author>
    <abstract>
```

The MarkLogic Query Language is a new book from MarkLogic Publishers that gives application programmers a thorough introduction to the MarkLogic query language.

```
    </abstract>
</citation>
```

This document contains data for one "citation" element. The "citation" element has within it a "title" element, an "author" element and an "abstract" element. In turn, the "author" element has within it a "last" element (last name of the author) and a "first" element (first name of the author). Thus, an XML document comprises text organized in freely-structured outline form with tags indicating the beginning and end of each outline element. Generally, an XML document comprises text organized in freely-structured outline form with tags indicating the beginning and end of each outline element. In XML, a tag is delimited with angle brackets followed by the tag's name, with the opening and closing tags distinguished by having the closing tag beginning with a forward slash after the initial angle bracket.

Elements can contain either parsed or unparsed data. Only parsed data is shown for the example document above. Unparsed data is made up of arbitrary character sequences. Parsed data is made up of characters, some of which form character data and some of which form markup. The markup encodes a description of the document's storage layout and logical structure. XML elements can have associated attributes in the form of name-value pairs, such as the publication date attribute of the "citation" element. The name-value pairs appear within the angle brackets of an XML tag, following the tag name.

XML schemas specify constraints on the structures and types of elements and attribute values in an XML document. The basic schema for XML is the XML Schema, which is described in "XML Schema Part 1: Structures Second Edition", W3C Recommendation (28 Oct. 2004), which is incorporated by reference herein for all purposes [and available at http://www.w3.org/TR/xmlschema-1/]. A previous and very widely used schema format is the DTD (Document Type Definition), which is described in the XML Recommendation. Encoded textual objects may also be formed using JavaScript Object Notation (JSON).

Since XML documents are typically in text format, they can be searched using conventional text search tools. However, such tools might ignore the information content provided by the structure of the document, one of the key benefits of XML. Several query languages have been proposed for searching and reformatting XML documents that do consider the XML documents as structured documents. One such language is XQuery, which is described in "XQuery 1.0: An XML Query Language", W3C Recommendation (14 Dec. 2010), which is incorporated by reference herein for all purposes [and available at http://www.w3.org/TR/xquery].

XQuery is derived from an XML query language called Quilt [described at http://www.almaden.ibm.com/cs/people/chamberlin/quilt.html], which in turn borrowed features from several other languages, including XPath 1.0 [described at http://www.w3.org/TR/xpath], XQL [described at Http://www.w3.org/TandS/QL/QL98/pp/xql.html], XML-QL [described at http://www.research.att.com/.about.mffl files/final.html] and OQL.

FIG. 1 illustrates a computer 100 configured in accordance with an embodiment of the invention. The computer 100 includes standard components, such as a central processing unit 110 and input/output devices 114 connected via a bus 114. The input/output devices may include a keyboard, mouse, touch screen, display and the like. A network interface circuit 116 is also connected to the bus 114. Thus, the computer 100 may operate in a networked environment.

A memory 120 is also connected to the bus 114. The memory 120 includes data and executable instructions to implement operations of the invention. A data loader 122 includes executable instructions to process documents and form encoded textual objects and selective pre-computed indices, as described herein. These encoded textual objects and indices are then stored in a database 124.

The modules in memory 120 are exemplary. These modules may be combined or be reduced into additional modules. The modules may be implemented on any number of machines in a networked environment. It is the operations of the invention that are significant, not the particular architecture by which the operations are implemented.

Figure 2:
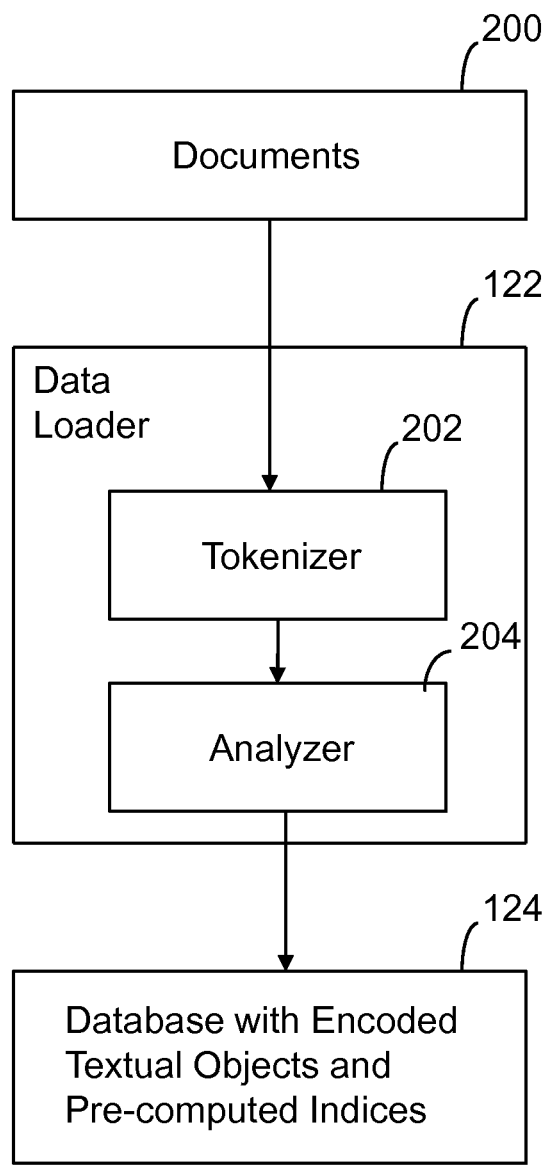
FIG. 2 illustrates components used to construct a database with encoded textual objects and pre-computed indices.

FIG. 2 illustrates interactions between components used to implement an embodiment of the invention. Documents 200 are delivered to the data loader 122. The data loader 122 may include a tokenizer 202, which includes executable instructions to produce tokens or segments for components in each document. An analyzer 204 includes executable instructions to form encoded textual objects with the tokens and then analyze the encoded textual objects. The analyzer forms encoded textual objects for each document. The encoded textual objects characterize the structure of a document. For example, in the case of a top-down tree the characterization is from a root node through a set of fanned out nodes. The analyzer also develops a set of pre-computed indices. The term pre-computed indices is used to distinguish from indices formed in response to a query. The resultant encoded textual objects and pre-computed indices are separately searchable entities, which are loaded into a database 124. The encoded textual objects support Xquery queries and other markup language queries. The pre-computed indices support multiple query languages, such as XQuery, XPath, XSLT, Full-text, Geospatial and SQL.

While encoded textual objects have been used in the prior art to support various search mechanisms, the disclosed technology supplements such encoded textual objects with the pre-computed indices, which may be conveniently formulated while producing the encoded textual objects. As demonstrated below, the pre-computed indices facilitate MapReduce processing.

Figure 3:
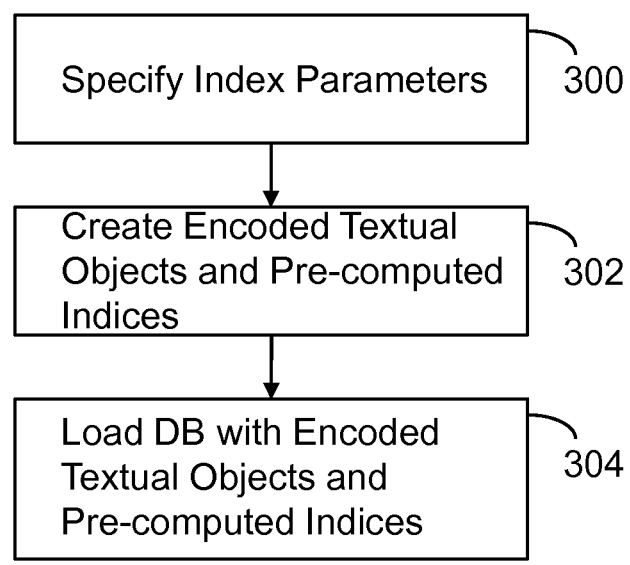
FIG. 3 illustrates processing operations to construct a database with encoded textual objects and pre-computed indices.

FIG. 3 illustrates processing operations associated with the components of FIG. 2. Initially, index parameters are specified. The pre-computed indices have specified path parameters. The path parameters may include element paths and attribute paths. An element is a logical document component that either begins with a start-tag and ends with a matching end-tag or consists only of an empty-element tag. The characters between the start- and end-tags, if any, are the element's content and may contain markup, including other elements, which are called child elements. An example of an element is <Greeting>Hello, world.</Greeting>.

An attribute is a markup construct comprising a name/value pair that exists within a start-tag or empty-element tag. In the following example the element img has two attributes, src and alt: <img src="madonna.jpg" alt='Foligno Madonna, by Raphael'/>. Another example is <step number="3">Connect A to B.</step> where the name of the attribute is "number" and the value is "3".

The next processing operation of FIG. 3 is to create encoded textual objects and pre-computed indices 302. Finally, a database is loaded with the encoded textual objects and pre-computed indices 304.

Figures 4, 5:
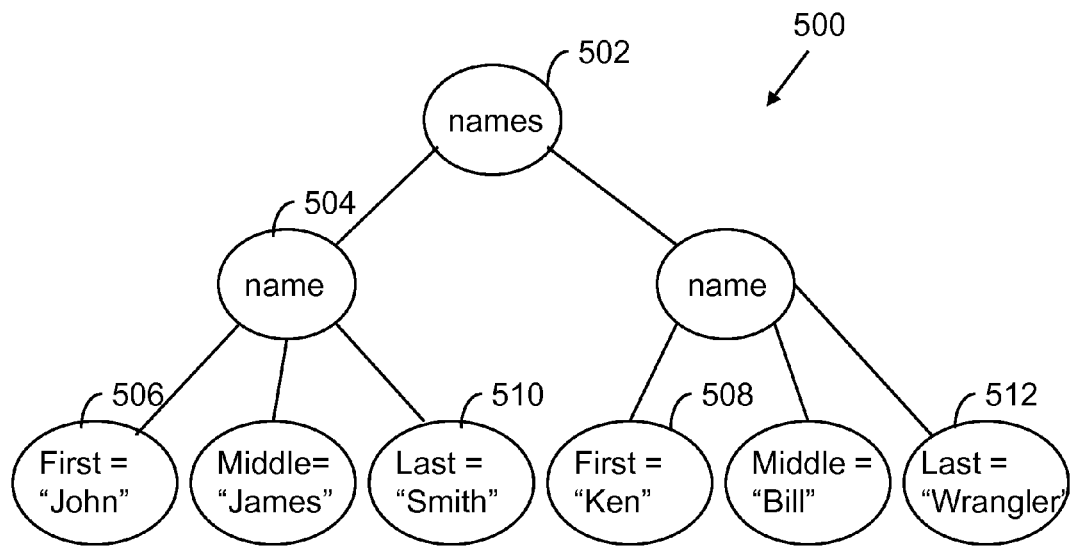
FIG. 4 illustrates a markup language document that may be processed in accordance with an embodiment of the invention.
FIG. 5 illustrates encoded textual objects in the form of a top-down tree characterizing the markup language document of FIG. 4.

FIG. 4 illustrates a document 400 that may be processed in accordance with the operations of FIG. 3. The document 400 expresses a names structure that supports the definition of various names, including first, middle and last names. In this example, the encoded textual objects are in the form of a tree structure characterizing this document, as shown in FIG. 5. This tree structure naturally expresses parent, child, ancestor, descendent and sibling relationships. In this example, the following relationships exist: "first" is a sibling of "last", "first" is a child of "name", "middle is a descendent of "names" and "names" is an ancestor of "middle".

Various path expressions (also referred to as fragments) may be used to query the structure of FIG. 5. For example, a simple path may be defined as /names/name/first. A path with a predicate may be defined as /names/name[middle="James"]/first. A path with a wildcard may be expressed as /*/name/first, where * represents a wildcard. A path with a descendent may be express as //first.

The indices used in accordance with embodiments of the invention provide summaries of data stored in the database. The indices are used to quickly locate information requested in a query. Typically, indices store keys (e.g., a summary of some part of data) and the location of the corresponding data. When a user queries a database for information, the system initially performs index look-ups based on keys and then accesses the data using locations specified in the index. If there is no suitable index to perform look-ups, then the database system scans the entire data set to find a match.

User queries typically have two types of patterns including point searches and range searches. In a point search a user is looking for a particular value, for example, give me last names of people with first-name="John". In a range search, a user is searching for a range of values, for example, give me last names of people with first-name>"John" AND first-name<"Pamela".

Observe that the type of indices required for these two types of queries are different. Point search does not need keys in the index to be stored in a sorted order, but the range index must store sorted values. Database systems usually exploit this subtle difference for efficiently implementing the two types of indices. Range indices contain the entire range of values in a sorted order stored in a data structure that is more suitable for extracting ranges. These data-structures are accessed as in-memory data-structures using operating system virtual memory mechanism or by directly reading index files into memory. This enables use of standard search algorithms for fast look-ups in these data-structures. On the other hand, value indices are stored in structures that are efficient for insertion and retrieval of point value, such as hash tables. A path range index is a collection of sorted values, for example found in an XML document using a user specified path expression. It is useful for queries that search a range of values on a particular path in the database. Similarly other range indices, such as an Element Range Index and a Field Range index are collections of sorted values from a particular element or a field.

The structure 500 of FIG. 5 is a tree representation of the XML document 400 of FIG. 4. A natural way of traversing trees is top-down, where one starts the traversal at the root node 502 and then visits the name node 504 followed by the first node 506. A path expression is a branch of a tree. An arbitrary branch of a tree, also referred to herein as a fragment, may be used to form a pre-computed index.

Document trees may be traversed at various times, such as when the document gets inserted into the database and after an index look-up has identified the document for filtering. Paths are traversed at various times: (1) when a document is inserted into a database, (2) during index resolution to identify matching indices, (3) during index look-up to identify all the values matching the user specified path range and (4) during filtering. The pre-computed indices of the invention may be utilized during these different path traversal operations.

Top-down traversal can be viewed as forward traversal. The advantage of top-down traversal is that it is natural and starts with the first node in the document tree or path expression. The database system has to keep track of all the nodes traversed subsequently until the traversal hits a leaf. If there are multiple path indices defined in a system, the system has to traverse all the paths starting at the root to the leaf. This can be very inefficient when there are many paths with large depths. The state of the art implementations of path indices use top-down traversals. They are not only inefficient, but also have a limitation that each path must start from the root of a document. In contrast, the invention uses a combination of top-down document traversal and pre-computed indices for efficient document processing.

Various pre-computed indices may be used. The indices may be named based on the type of sub-structure used to create them. Embodiments of the invention utilize pre-computed element range indices, element-attribute range indices, path range indices, field range indices and geospatial range indices, such as geospatial element indices, geospatial element-attribute range indices, geospatial element-pair indices, geospatial element-attribute-pair indices and geospatial indices.

FIG. 6 illustrates an element range index 600 that may be used in accordance with an embodiment of the invention. The element range index 600 stores individual elements from the tree structured document 500. The element range index 600 includes value column 602, a document identifier column 604 and position information in the document 606. Entry "John" 608 corresponds to element 506 in FIG. 5, while entry "Ken" 610 corresponds to element 508 in FIG. 5.

Figure 7:
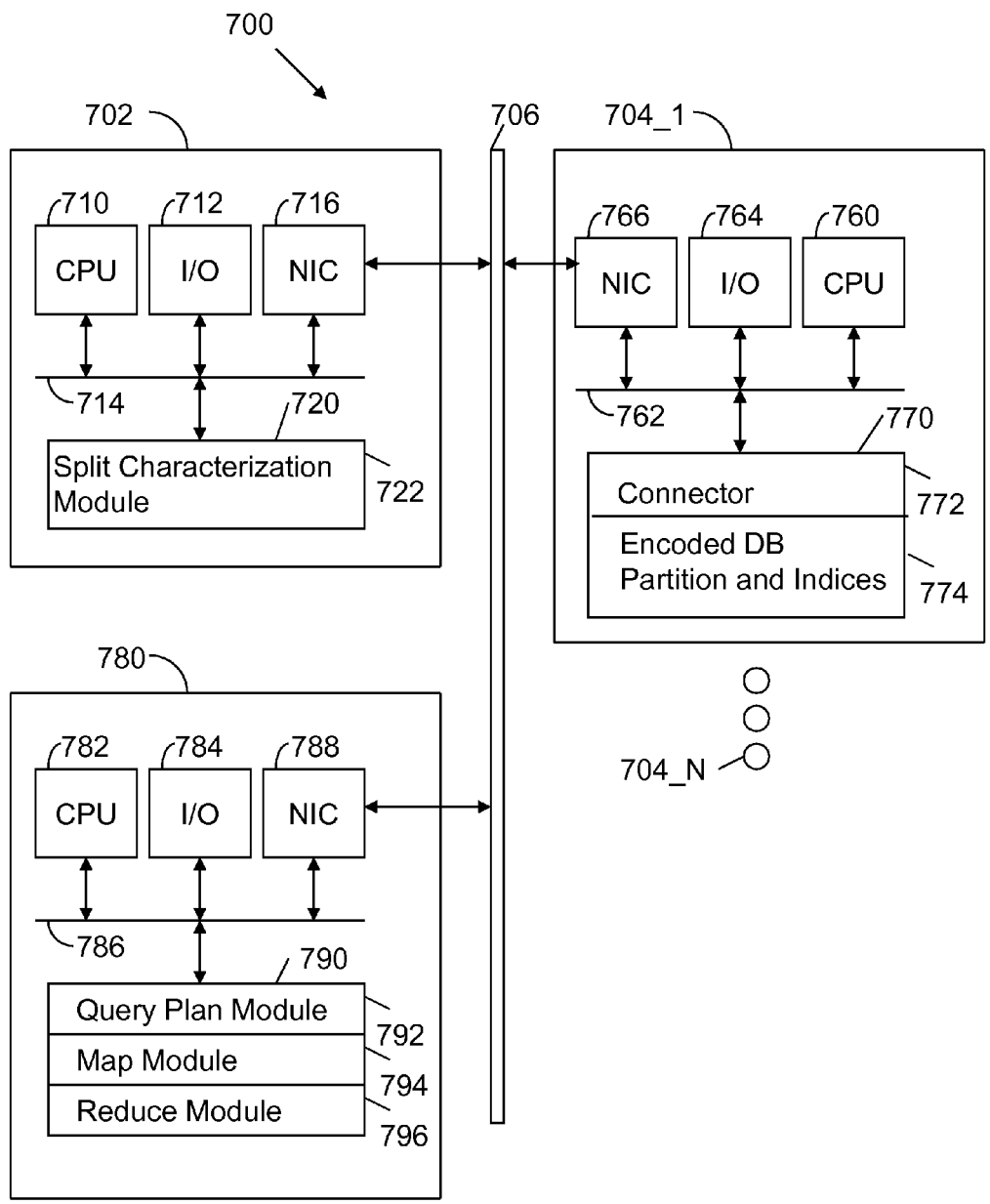
FIG. 7 illustrates a system configured in accordance with an embodiment of the invention.

FIG. 7 illustrates a system 700 configured in accordance with an embodiment of the invention. The system 700 implements a distributed database. The system includes a client device 702 and a set of worker nodes 704_1 through 704_N connected via a network 706, which may be any wired or wireless network. A master node 780 is also connected to the network 706.

The client device 702 includes standard components, such as a central processing unit 710 connected to input/output devices 712 via a bus 714. A network interface circuit 716 is also connected to the bus 714. A memory 720 is also connected to the bus 714. The memory 720 stores a split characterization module 722. The split characterization module 722 includes executable instructions to implement operations of the invention. In particular, the split characterization module 722 operates in a MapReduce environment to secure preliminary information about encoded textual object fragments, which is subsequently used for MapReduce processing, as discussed below.

Each worker node 704 includes standard components, such as a central processing unit 760 and input/output devices 764 connected via a bus 762. A network interface circuit 766 is also connected to the bus 762. A memory 770 is also connected to the bus 762. The memory 770 stores executable instructions to implement operations of the invention. In one embodiment, the memory 770 stores a connector 772. The connector 772 includes executable instructions that form an interface between a client device 702 and a database partition with encoded textual objects and associated indices 774.

The master node 780 also includes standard components, such as a central processing unit 782 and input/output devices 784 connected via a bus 786. A network interface card 788 is also connected to the bus 786. A memory 790 is also connected to the bus 786. The memory 790 stores executable instructions to implement operations of the invention. In particular, the memory 790 stores a query plan module 792. The query plan module 792 includes executable instructions to process the preliminary information produced by the split characterization module 722. This preliminary information is used to develop an efficient query plan (i.e., define how a query should be processed in view of the preliminary information). A map module 794 thereafter implements a standard map operation, while the reduce module 796 implements a standard reduce operation.

Figure 8:
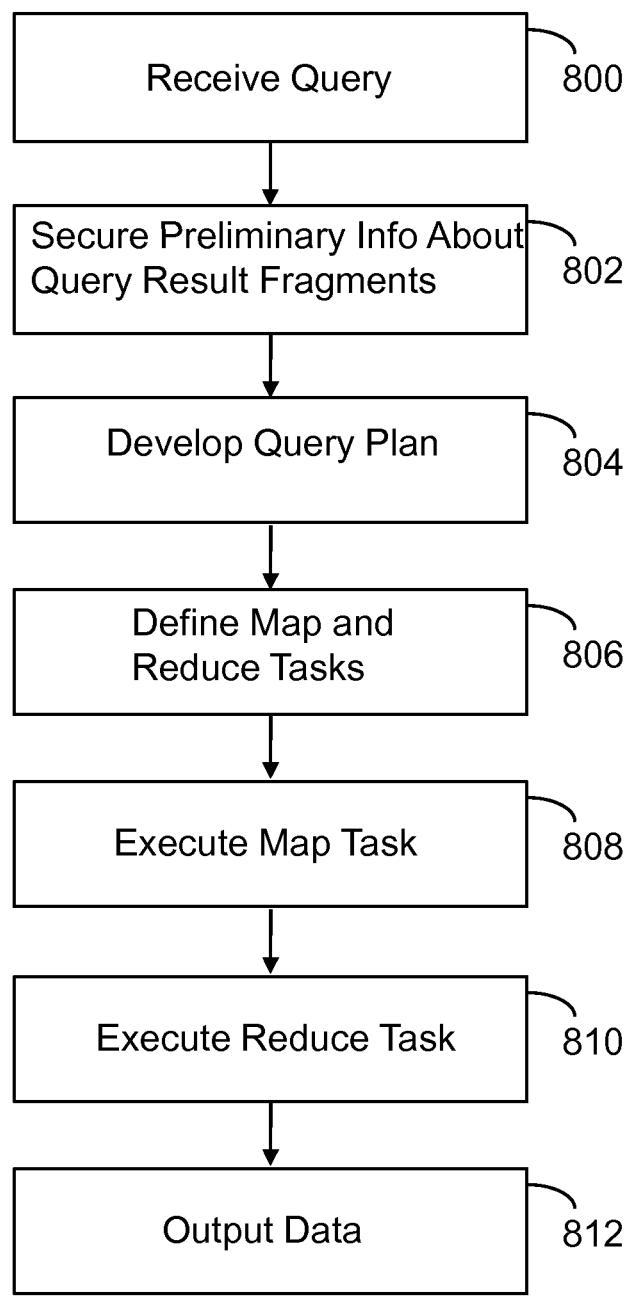
FIG. 8 illustrates processing operations associated with an embodiment of the invention.

FIG. 8 illustrates processing operations executed by the system 700 of FIG. 7. A query is received 800 at a client device 702. The split characterization module 722 secures preliminary information about query result fragments 802. In particular, the split characterization module 722 divides the query into split characterization queries. The split characterization queries are distributed to worker nodes 704. Each worker node 704 stores a database with encoded textual objects characterizing documents and pre-defined indices characterizing encoded textual object fragments.

The split characterization queries are executed at the worker nodes 704 to obtain preliminary information about query results. Split characterization query execution includes matching query fragments with encoded textual object fragments of the pre-defined indices to produce fragment matches representative of the size of the query results.

For each split characterization query, the preliminary information about query results may include a fragment offset, a fragment count, a database partition identification, and a database host name. In one embodiment, each input split is associated with a single database partition. Each input split has a subset of input data assigned to a map task. Each database partition has an associated worker node host.

The connector 772 on each worker node 704 processes a split characterization query. As discussed below, the connector 772 may be accessed through an Application Program Interface (API). The connector executes the split characterization query to generate the preliminary information. The preliminary information is then passed to the query plan module 792. For example, the connector API may be used to pass the information.

A query plan is then developed based upon this preliminary information 804. The query plan utilizes the preliminary information to determine where map tasks should be executed. Map and reduce tasks are then defined 806. The map task is executed 808. In particular, a map task is assigned to a worker node 704. The connector 770 at the worker node accesses the information in the database partition 774 to generate results in the form of a set of output key-value pairs. The output-key value pairs are passed to the reduce module 794. The reduce task is then executed 810 on the master node 780 to produce a set of final result key-value pairs, which constitutes output data 812.

As previously indicated, the invention secures preliminary information in the form of an input split and associated fragment offset, fragment count, partition identification and host name. When a split characterization query is received at the connector 772, the connector resolves the relevant fragments and partitions through an index lookup. The connector then partitions the relevant fragments into input splits. This minimizes the redundant work that each task performs. The connector also associates a host with each input split. This allows a job tracker to schedule a map task to run in closest proximity of the host, thereby saving network bandwidth and processing time.

Thus, the pre-computed indices are used to partition a resolved list of fragments into input splits. Given an input split created in this way, a map task's query is scoped within the subset of fragments. The host location is included in an input split through an application program interface (e.g., a Hadoop Mapreduce API). This enables a map operation to be computed where the data is. Thus, the map task does not need to fetch data over the network.

In one embodiment, the connector 772 has an application program interface (API) that allows for different scenarios to define or generate a split characterization query or an input query. A split characterization query is a query used by the connector at job submission time to generate splits. The split characterization query returns a sequence of partition identification, host name of the partition and total fragment count in the partition. A fragment offset and fragment position range may also be specified. The connector then breaks up or combines the fragment sets in each partition based upon a user-specified (or default) input split size.

An input query is a query used by the connector in each map task to fetch data from a database partition. The query is constrained by the input split definition. The query is issued to the host where the input split is located. The connector uses the partition containing the fragments as the content base when issuing the query so execution of the query is scoped within that partition. That is, the indices are used to search specified fragments (e.g., sub-sets of the indices) instead of the entire database. Preferably, the query is parameterized with the input split range or fragment position range (e.g., fragment start and end) so the worker node leverages the range to perform the query.

As indicated above, the connector API may support different scenarios to define or generate the split characterization query and input query. In one scenario, the user specifies a document selector (e.g., a fully searchable Xpath expression) and optionally a subdocument expression through job configuration. For example, a function "fn:collection("wikipedia")" identifies all document nodes in a split that are in the "wikipedia" collection. A subdocument expression "//wp:nominee" identifies all "wp:nominee" elements in documents in the split that are in the "wikipedia" collection.

The connector generates the split characterization query based on the document selector and queries each partition for a fragment count using a predefined function (e.g., xdmp:estimate( ). The fragment count is returned through an index lookup based on the expression. The connector generates the input query based on the document selector and subdocument expression, e.g., fn:collection("oscar")[$start to $end]/a

[@href and @title]. Using the fragment range specified in the query, the worker node skips to the starting fragment and stops at the ending fragment while executing the query.

In another scenario, the API supports a user constructed lexicon function class, which specifies certain parameters a lexicon function takes. The connector generates the split characterization query based on the lexicon function's query parameter in the form of xdmp:estimate(cts:search( . . . , $query, . . . )), which can be achieved through an index lookup in the worker node. The connector generates the input query based on the lexicon function class the user configured. Lexicon functions expose "skip" and "truncate" parameters, which allows the connector to pass the fragment range to it so the execution of the lexicon query only processes the relevant fragments.

Another API supported scenario is where a user directly specifies the split characterization query and input query. The input query takes the split start and split end as two external variables, which are passed in by the connector at run time based on the split information. This is the generalized form of the two scenarios above.

In one embodiment, the API operates as an interface for a Hadoop MapReduce job. In particular, the API connector provides data input access from a Hadoop MapReduce job to a worker node. The following should be configurable for a MapReduce job: input server, identified by host, port user and password; input path expression or query; and input format. The input format may be specified as follows:

| Type | Key | Value |
|---|---|---|
| Document | Document URI | Document |
| Node | Node Path | Node |
| Value | Key value returned from server in user specified type | Value in user specified type |
| | System generated key | |

The identity of the host of the input data may be obtained through the Hadoop API. This allows the Hadoop job scheduler to schedule map tasks close to the input data. Advantageously, the record counts in the generated splits do not have to be accurate. The returned record counts are sufficient to implement a query plan.

The connector API also provides data output access from a Hadoop reduce task to a worker node. The following should be configurable for a MapReduce job: output server, identified by host, port, user and password; and output format, which maybe in the following form:

| Type | Key | Value | Operation |
|---|---|---|---|
| Document | Document URI | Document | Insert Document The following should be configurable in the job configuration: output directory output collection list output permission list output quality |
| Node | Node path | Node | xdmp: node-insert-before xdmp: node-insert-after xdmp: node-insert-child xdmp: node-replace |
| Property | Document URI | Node | xdmp: document-add-properties xdmp: document-set-property |

In one embodiment, the connector implements a public API defined by Hadoop MapReduce and has the following properties.

Interface

| | |
|---|---|
| Constants | Contains constants used in the package, e.g., configuration property names |
| SslConfigOptions | Interface used to get options for Secure Socket Layer (SSL) connection |

Classes for Keys

| | |
|---|---|
| Document URI | Document Uniform Resource Identifier (URI) used as a key for a document record. |
| NodePath | Node path used as a key for a node record. |

Class for Values

| | |
|---|---|
| LogicNode | A node returned by a worker node; used to represent any of the following types of nodes: attribute, binary, document, element and text. |

Classes for Input

| | |
|---|---|
| LogicInputFormat <KEYIN, VALUEIN> | Abstract class. Specified InputFormat |
| DocumentInputFormat | Specified InputFormat for document with document URI as the key. |
| NodeInputFormat | Specified InputFormat for node with NodePath as the key. |
| ValueInputFormat <VALUEIN> | Specified InputFormat for a value other than document or node with system-generated key. |
| KeyValueInputFormat <KEYIN, VALUEIN> | Specified InputFormat for a value other than document or node with key returned from working node. |
| RecordReader <KEYIN, VALUEIN> | Abstract class. A RecordReader that fetches data from worker node and generates key value pairs. |
| DocumentReader | Specified RecordReader for documents where the key is Document URI. |
| Node Reader | Specified Record Reader for nodes where the key is NodePath. |
| ValueReader <VALUEIN> | Specified RecordReader that fetches data from worker node and generates key value pairs, with the key being a system generated integer and value in user specified type. |
| KeyValueReader <KEYIN, VALUEIN> | Specified RecordReader that fetches data from worker node and generates key value pairs in user specified types. |
| LogicInputSplit | Specified InputSplit used to represent a group of records returned by a worker node and identify originating host. |

Classes for Output

| | |
|---|---|
| OutputFormat <KEYOUT, VALUEOUT> | Abstract class. Specified OutputFormat taking a generic key and value class. |
| ContentOutputFormat <VALUEOUT> | Specified OutputFormat for documents taking a generic value class. |
| NodeOutputFormat | Specified OutputFormat for XML nodes. |
| PropertyOutputFormat | Specified OutputFormat for document properties. |
| RecordWriter <KEYOUT, VALUEOUT> | Abstract class. A RecordWriter that persists node to server (worker node). |
| ContentWriter <VALUEOUT> | Specified RecordWriter that inserts content to worker node taking a generic value class. |
| NodeWriter | Specified RecordWriter to insert/replace a node to worker node. |
| PropertyWriter | Specified RecordWriter that adds/sets a property for a document. |

The connector API may also support a variety of user configurable parameters, such as: input server name (worker node), host server, server port, path expression used to retrieve records, splitquery (i.e., split characterization query that returns partition identification, fragment count, host name), maximum split size, ratio of number of retrieved records to number of accessed fragments, query used to retrieve records from server, class to be used for storing input keys, class to be used for storing input values, output server name, host of output server, output directory, comma-separated list of collections, comma-separated list of user-privilege pairs, comma-separated alias-URI pairs used for node operations, property output operation type and type of output document format.

Input split creation may be controlled by supplying an input split query (split characterization query). The input split query may be a configuration property, such as "mapreduce .input.splitquery". The input split query generates (partition identification, record-count, host-name) tuples. A fragment offset may also be generated. A split query may be built using the Xquery library function "hadoop:get-spits" in combination with a specified Xpath query and "cts:query".

The split query returns a host name and partition identification because the connector interacts with the worker node at the partition level. When a split is assigned to a map task, the connector running in the task submits the input query directly against the partition identified in the split tuple. The hostname and partition identification in the split tuple identify the target partition.

The record-count in the split tuple only needs to be a rough estimate of the number of input key-value pairs in the split. The estimate need not be accurate. What constitutes a record is job-dependent. For example, a record can be a document fragment, a node or a value from a lexicon. For example, basic input mode uses a simple estimate of the total number of documents in each partition. When the input query runs against a split it can generate more or fewer input key-value pairs than estimated. The more accurate the record count estimate is the more accurately Hadoop balances workload across tasks.

In one embodiment, an input split never spans multiple partitions, but the content in a single partition may span multiple splits. The maximum number of records in a split is configurable. In one embodiment, the connector, rather than the split query, handles bounding splits by the maximum.

Aspects of the invention are more fully appreciated in connection with the following example. Consider a Wikipedia article such as this one: http://en.wikipedia.org/wiki/Austria. It contains links to other Wikipedia articles, e.g. "European Union", "Central Europe" etc. If one wanted to compute the top referenced articles in all Wikipedia articles, one could perform the following:

1) For each Wikipedia article that contains references to other articles, get a summary of the URI and reference count of articles being referenced in the article.
2) Add up the reference count for each article across all Wikipedia articles.

The disclosed techniques may be used to efficiently implement these operations. For example, a user may specify the following:
Document selector: fn:collection("Wikipedia")
Subdocument expression: //wp:a[@href and @title and not (fn:starts-with(@href, "#") or fn:starts-with(@href, "http://") or fn:starts-with(@href, "File:") or fn:starts-with(@href, "Image:"))]/@title The connector queries the database for the database partition, host topology and number of document counts in each partition. This produces the following preliminary information:
Output of the Split Query:
Partition: F1
Host: Host1
Document count: 10 k
Partition: F2
Host: Host1
Document count: 15 k
. . .
Assume that the max split size is 10 k, the resulting input splits are:
Split1:
Partition: F1
Host: Host1
Starting document: 1
Ending document: 10,000
Split2:
Partition: F2
Host: Host2
Starting document: 1
Ending document: 7500
Split3:
Partition: F2
Host: Host2
Starting document: 7501
Ending document: 15000
. . .

Concurrently a map task is assigned one input split. Say map task 003 is given split 3. It issues the following query against partition F2:
fn:collection("Wikipedia")[7501 to 15000]/wp:a[@href and @title and not (fn:starts-with(@href, "#") or fn:starts-with(@href, "http://") or fn:starts-with(@href, "File:") or fn:starts-with(@href, "Image:"))]/@title The position range [7501 to 15000] is utilized during index lookup when the above query is processed in the database so that documents that fall out of the range of 7501 to 15000 are not processed.

The above query feeds the reference links to the map task, e.g. <a href="Central_Europe" title="central Europe">central European</a>. The map task extracts the href attribute "Central Europe" and writes out (href, 1) pairs.

All unique href links are grouped together and are summarized in a reduce step. In this example, "Central_Europe" is referenced for a total of 180 times among all Wikipedia documents. The reduce task computes the total reference count and updates it as a property for the article in the database.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of processing a query in a distributed database implemented across a plurality of nodes, comprising:
   receiving a query;
   dividing the query into split characterization queries;
   distributing the split characterization queries to a plurality of worker nodes, wherein each worker node stores a partition of the distributed database as a database with encoded textual objects and pre-defined indices characterizing encoded textual object fragments; and
   executing the split characterization queries at the plurality of worker nodes to obtain preliminary information about query results, wherein executing the split characterization queries includes matching query fragments associated with the split characterization queries with encoded textual object fragments to produce fragment matches representative of the size of the query results, wherein for each split characterization query the preliminary information about query results includes a fragment count, a database partition identification, and a database host name.

2. The method of claim 1 wherein the preliminary information further includes a fragment offset.

3. The method of claim 1 wherein the preliminary information further includes a fragment position range utilized in connection with the pre-defined indices during execution of a map task.

4. The method of claim 1 further comprising associating an individual input split with a database partition.

5. The method of claim 4 wherein each database partition has an associated worker node host.

6. The method of claim 4 wherein the input split has subsets of input data assigned to a map task.

7. The method of claim 6 further comprising executing the map task, wherein the map task transforms data in an input split into a set of output key-value pairs.

8. The method of claim 7 further comprising processing the output key-value pairs as a reduce task, wherein the reduce task produces a set of final result key-value pairs.

9. A non-transitory computer readable storage medium, comprising executable instructions to:
   execute a split characterization query against a partition of a distributed database with encoded textual objects and pre-defined indices characterizing encoded textual object fragments, wherein the executable instructions to execute include executable instructions to match query fragments associated with the split characterization query with encoded textual object fragments of the pre-defined indices to produce fragment matches representative of the size of query results; and
   generate preliminary information about the query results, wherein the preliminary information includes a fragment count, a database partition identification, and a database host name.

10. The non-transitory computer readable storage medium of claim 9 further comprising executable instructions to execute a map task configured based upon the preliminary information.

11. The non-transitory computer readable storage medium of claim 10 wherein the map task associates an input split with a database partition.

12. The non-transitory computer readable storage medium of claim 11 wherein the database partition has an associated worker node host.

13. The non-transitory computer readable storage medium of claim 10 further comprising executable instructions to execute a reduce task.

14. The non-transitory computer readable storage medium of claim 9 further comprising an application program interface to receive the split characterization query.

15. The non-transitory computer readable storage medium of claim 9 further comprising an application program interface to convey the preliminary information to a MapReduce map task module.

16. The non-transitory computer readable storage medium of claim 9 wherein the preliminary information further includes a fragment position range utilized in connection with the pre-defined indices during execution of a map task.

* * * * *